United States Patent
Richman et al.

(10) Patent No.: US 11,159,831 B2
(45) Date of Patent: Oct. 26, 2021

(54) NON-REAL TIME (NRT) MEMORY MANAGEMENT IN ADVANCED TELEVISION SYSTEMS COMMITTEE (ATSC) 3.0 SYSTEM

(71) Applicant: Sony Corporation, Tokyo (JP)

(72) Inventors: Steven Richman, San Diego, CA (US); Arthur C. Medina, Jr., Chula Vista, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/735,955

(22) Filed: Jan. 7, 2020

(65) Prior Publication Data
US 2021/0211747 A1    Jul. 8, 2021

(51) Int. Cl.
*H04N 21/231*    (2011.01)
*H04H 60/40*    (2008.01)
*H04H 60/27*    (2008.01)

(52) U.S. Cl.
CPC ...... *H04N 21/23106* (2013.01); *H04H 60/27* (2013.01); *H04H 60/40* (2013.01)

(58) Field of Classification Search
CPC ... H04N 21/23106; H04H 60/27; H04H 60/40
See application file for complete search history.

(56) References Cited

U.S. PATENT DOCUMENTS

| | | | |
|---|---|---|---|
| 5,930,816 A | 7/1999 | Fujita | |
| 2008/0313029 A1* | 12/2008 | Evans | G06Q 30/0255 705/14.53 |
| 2013/0212621 A1 | 8/2013 | Corl et al. | |
| 2013/0227608 A1* | 8/2013 | Evans | H04N 21/812 725/35 |
| 2014/0053174 A1* | 2/2014 | Eyer | H04N 21/23614 725/13 |
| 2014/0208375 A1 | 7/2014 | Fay et al. | |
| 2014/0282759 A1* | 9/2014 | Harvey | H04N 21/4668 725/89 |
| 2015/0172783 A1* | 6/2015 | Kim | H04N 21/44008 725/110 |
| 2016/0080796 A1* | 3/2016 | Fay | H04N 21/472 725/40 |

(Continued)

OTHER PUBLICATIONS

"RFC 4033, DNS Security Introduction and Requirements," Arends, R., Austein, R., Larson, M., Massey, D., and S. Rose, Internet Engineering Task Force, Fremont, CA, Mar. 2005.

(Continued)

*Primary Examiner* — Ario Etienne
*Assistant Examiner* — Kidest Mendaye
(74) *Attorney, Agent, or Firm* — John L. Rogitz (57) ABSTRACT

Techniques are described for expanding and/or improving the Advanced Television Systems Committee (ATSC) 3.0 television protocol in robustly delivering the next generation broadcast television services. Broadcaster non-real time (NRT) data packets are downloaded into RAM memory first and then saved to disk once the complete NRT package is in RAM. Old saved NRT data is retained until channel change with new NRT data, at which point old NRT data may be deleted before starting to save the new oncoming NRT data. Old NRT data may be deleted only when the new oncoming NRT data is not the same as the old.

15 Claims, 4 Drawing Sheets

(56) References Cited

U.S. PATENT DOCUMENTS

| | | | |
|---|---|---|---|
| 2016/0182973 A1* | 6/2016 | Winograd | H04N 21/4722 725/25 |
| 2017/0006341 A1* | 1/2017 | Lee | H04N 21/4342 |
| 2017/0177584 A1* | 6/2017 | Narasimha | H04N 21/235 |
| 2017/0272689 A1 | 9/2017 | Eyer | |
| 2018/0067876 A1* | 3/2018 | Deshpande | H04N 21/4332 |
| 2018/0192139 A1* | 7/2018 | Deshpande | H04N 21/4122 |
| 2018/0376100 A1* | 12/2018 | Kitahara | H04N 21/6581 |

OTHER PUBLICATIONS

"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.

"ATSC Standard: ATSC 3.0 Interactive Content (A/344)", May 2, 2019.

"ATSC Standard: ATSC 3.0 Security and Service Protection", Aug. 20, 2019.

"ATSC Standard: ATSC 3.0 System", Sep. 17, 2019.

"ATSC Standard: Signaling, Delivery, Synchronization, and Error Protection (A/331)", Jun. 19, 2019.

"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.

"RFC 5280, Internet X.509 Public Key Infrastructure Certificate and Certificate Revocation List (CRL) Profile," D. Cooper, S. Santesson, S. Farrell, S. Boeyen, R. Housley, W Polk, Internet Engineering Task Force, Fremont, CA, May 2008.

"RFC 5289, TLS Elliptic Curve Cipher Suites with SHA-256/384 and AES Galois Counter Mode (GCM)," E. Rescorla, Internet Engineering Task Force, Fremont, CA, Aug. 2008.

"RFC 5480, Elliptic Curve Cryptography Subject Public Key Information," S. Turner, D Brown, K. Yiu, R. Housley, T. Polk, Internet Engineering Task Force, Fremont, CA, Mar. 2009.

"RFC 5652, Cryptographic Message Syntax (CMS)," R. Housley, Internet Engineering Task Force, Fremont, CA, Sep. 2009.

"RFC 5751, Secure/Multipurpose Internet Mail Extensions (S/MIME) Version 3.Message Specification," B. Ramsdell, S. Turner, Internet Engineering Task Force, Fremont, CA, Jan. 2010.

"RFC 5753, Use of Elliptic Curve Cryptography (ECC) Algorithms in Cryptographic Message Syntax (CMS)," S. Turner D. Brown, Internet Engineering Task Force, Fremont, CA, Jan. 2010.

"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.

"RFC 5940, Additional Cryptographic Message Syntax (CMS) Revocation Information Choices," S. Turner, R. Housley, Internet Engineering Task Force, Fremont, CA, Aug. 2010.

"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.

"RFC 5019, The Lightweight Online Certificate Status Protocol (OCSP) Profile for High-Volume Environments," A. Deacon, R. Hurst, Internet Engineering Task Force, Fremont, CA, Sep. 2007.

\* cited by examiner

NON-REAL TIME (NRT) MEMORY MANAGEMENT IN ADVANCED TELEVISION SYSTEMS COMMITTEE (ATSC) 3.0 SYSTEM

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, ATSC 3.0 permits switching providing an audio video stream from broadcast to broadband and back again, for instance, when the ATSC 3.0 broadcast signal degrades due to noise issues or wave propagation issues. To manage the same stream OTA and OTT, content and related metadata must be pre-buffered locally at the receiver or on the Internet. While local processing by fast receivers is desirable, some broadcasters can be expected to prefer to pre-buffer or pre-cache on the Internet and signal the receivers to play back the content. In both cases, present principles realize that accurate clocking and effective memory management is needed to accurately and seamlessly switch from playing content from broadband to playing the same content as broadcast. Signaling the switch must occur in the "past" in preparation to switch the live event and all data required for display must be available simultaneously using the same clocking mechanism to avoid introducing delays into the rendering. This is particularly true when dealing with content delivered via motion pictures expert group (MPEG) media transport protocol (MMTP) as opposed to content delivered via real-time object delivery over unidirectional transport (ROUTE).

Thus, techniques described herein are directed to optimizing memory resources for the memory management of ATSC 3.0 data, and in particular for non-real time (NRT) data to avoid overloading real time accessible random access memory (RAM) with data that is not immediately used or needed while ensuring that data is available in fast memory when needed.

Accordingly, a digital television system such as an Advanced Television Systems Committee (ATSC) 3.0 system includes at least one receiver device that in turn includes at least one display, at least one broadcast signal receiver, and at least one processor configured with instructions which when executed by the processor configure the processor to receive from the broadcast receiver at least one audio video (AV) stream for live presentation of the AV stream on the display. The instructions are executable to receive from the broadcast receiver at least one non-real time (NRT) content that includes at least one advertisement or at least one news content or both. Moreover, the instructions are executable to store the NRT content in random access memory (RAM) such as, for example, dynamic RAM (DRAM) or synchronous DRAM (SDRAM) until the NRT content is entirely received. The instructions are executable to move the NRT content from RAM to a first storage different from the RAM upon completing receipt of the NRT content in the RAM, and then responsive to determining that an insertion time in the AV stream for the NRT content satisfies a first test, copy or move the NRT content back from the first storage to the RAM. At the insertion time, the NRT content is inserted from the RAM into the AV stream.

In example embodiments, the first test includes identifying that the insertion time is within a first period of a current time. The first storage may include a disk drive and/or a flash memory. In example implementations the instructions can be executable to, responsive to determining that the insertion time satisfies a second test, copy or move the NRT content from the disk drive to flash memory, and responsive to determining that the insertion time satisfies the first test, copy or move the NRT content from the flash memory to the RAM. The second test can include identifying that the insertion time is within a second period of a current time and the first test can include identifying that the insertion time is within a first period of the current time, and the second period is longer than the first period (meaning the second test in this example is performed prior to the first test).

In example embodiments, the NRT content can be first NRT content and the instructions can be executable to, responsive to a channel change command from a first channel to a second channel, identify second NRT content associated with a second channel, remove any first NRT content from the RAM, and after removing the first NRT content from the RAM, save the second NRT content to the RAM. In the event that the second NRT content is the same as the first NRT content, the first NRT content is not removed from the RAM and the second NRT content is not copied into the RAM.

In another aspect, in a digital television delivery system, a method includes receiving broadcast non-real time (NRT) content for later insertion thereof into an audio video (AV) stream. The method includes storing the NRT content in random access memory (RAM), and then moving the NRT content from the RAM to a first storage. The method also includes, responsive to an insertion time approaching, copying the NRT content from the first storage to the RAM, and at the insertion time, inserting the NRT content into the AV stream for play thereof on at least one display.

In another aspect, a digital broadcast television (TV) system includes at least one broadcaster assembly configured for broadcasting an audio video (AV) stream and a non-real time (NRT) content associated with the AV stream. The system further includes at least one receiver device configured for receiving the AV stream and the NRT content and moving the NRT content from an initial storage location in random access memory (RAM) to a disk drive or a flash memory and then moving or copying the NRT content back to the RAM for insertion thereof into the AV stream at an insertion time.

The details of the present application, both as to its structure and operation, can best be understood in reference

DETAILED DESCRIPTION

This disclosure relates to technical advances in Advanced Television Systems Committee (ATSC) 3.0 television. A system herein may include ATSC 3.0 source components and client components, connected via broadcast and/or over a network such that data may be exchanged between the client and ATSC 3.0 source components. The client components may include one or more computing devices including televisions (e.g. smart TVs, Internet-enabled TVs), personal computers such as laptops and tablet computers, and mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Figure 1:
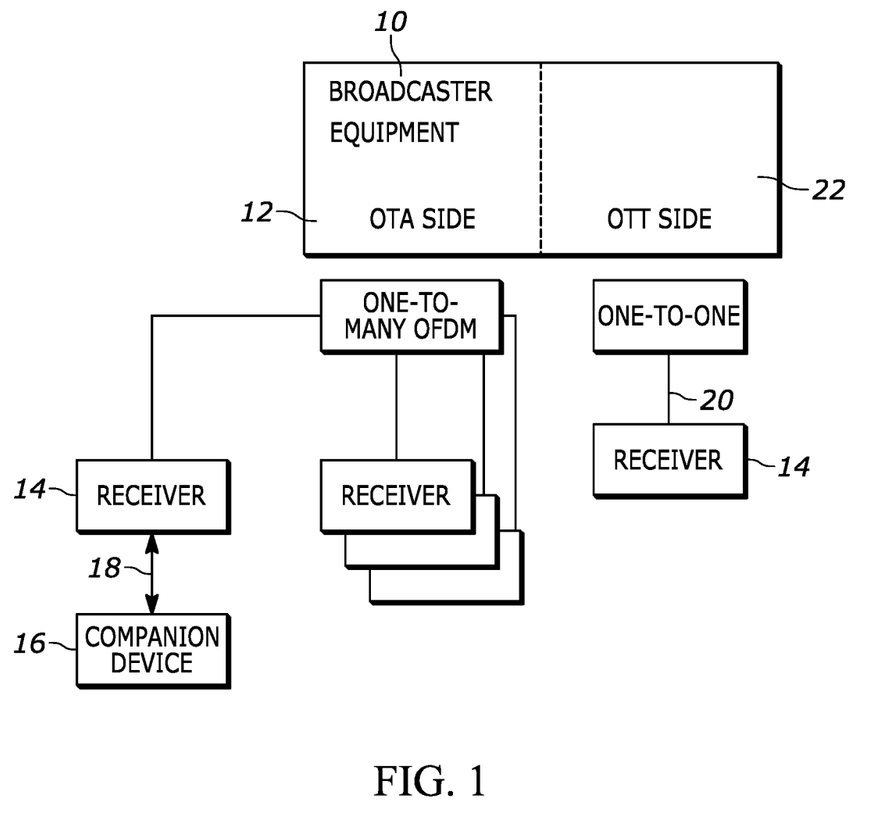
FIG. 1 is a block diagram of an Advanced Television Systems Committee (ATSC) 3.0 system.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television service and may also receive related content, including television, via the OTT (broadband) path. Note that computerized devices described in all of the figures herein may include some or all of the components set forth for various devices in FIGS. 1 and 2.

Figure 2:
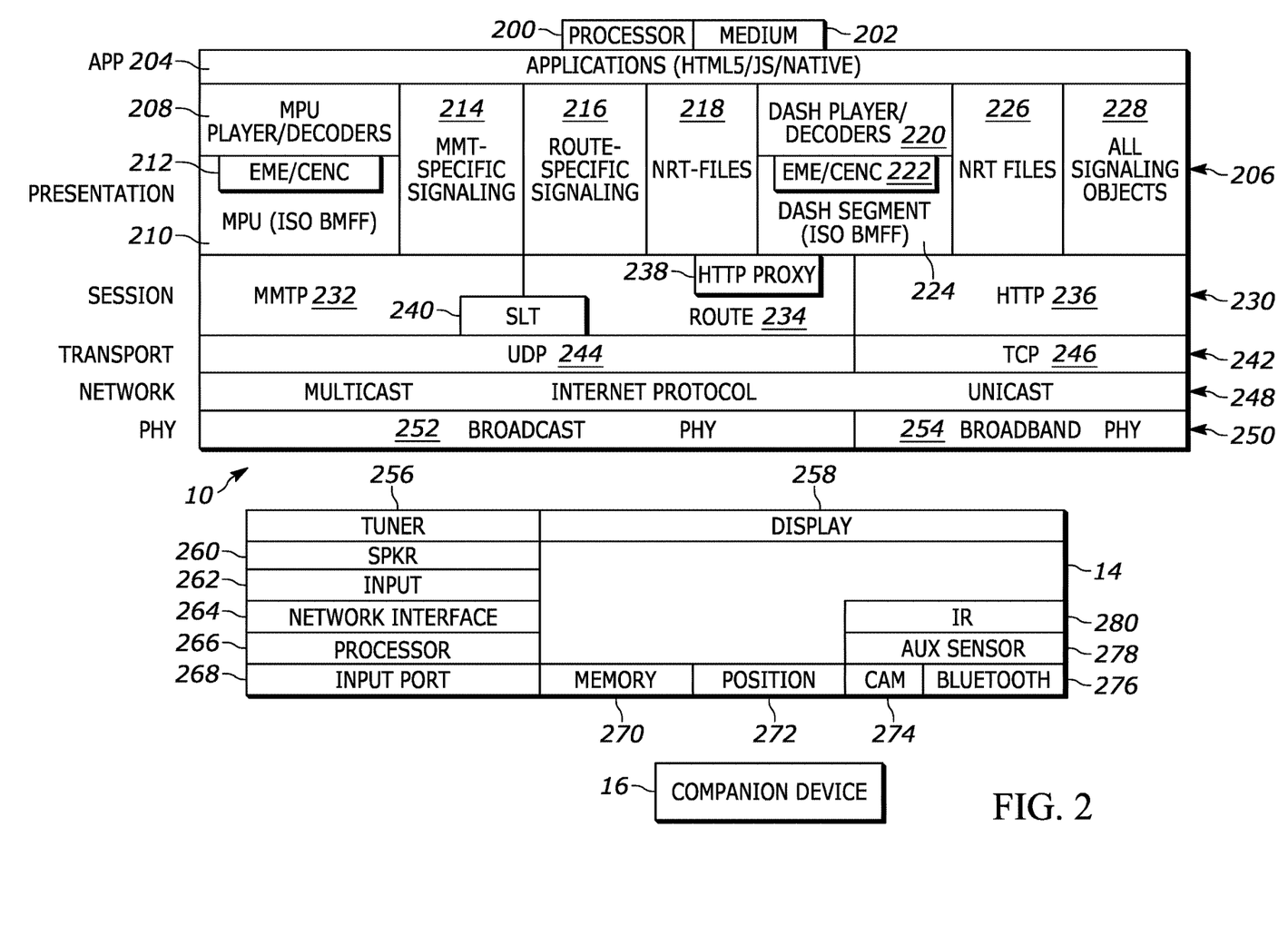
FIG. 2 is a block diagram showing components of the devices shown in FIG. 1.

Referring now to FIG. 2, details of the components shown in FIG. 1 may be seen. FIG. 2 illustrates a protocol stack that may be implemented by a combination of hardware and software. As discussed below, using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)).

The broadcaster equipment 10 can include one or more processors 200 accessing one or more computer storage media 202 such as any memories or storages described herein to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access broadcast side encrypted media extensions (EME)/ common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/ BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The protocol stack also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts machine access code (MAC) format to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with a an ATSC 3.0 TV tuner (equivalently, set top box providing an audiovisual display to a TV monitor) 256. The software architecture in receiver 14 may be based on the Android® operating system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is/are configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
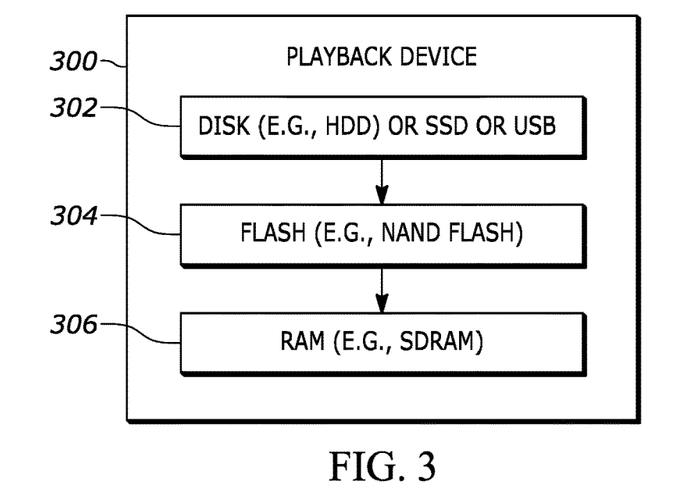
FIG. 3 is a block diagram of an example receiver with example types of memories.

Now referring to FIG. 3, a playback device 300 may include any of the components discussed above in relation to FIGS. 1 and 2 and may further include a disk drive 302 such as a hard disk drive, an optical disk drive, a universal serial bus (USB) drive, and combinations thereof. The disk drive 302 can communicate with other memories that may also communicate with each other for purposes to be shortly disclosed, including a flash memory 304 such as a not-and (NAND) flash and a random access memory (RAM) 306 such as a dynamic RAM (DRAM) and/or synchronous DRAM (SDRAM).

Figure 4:
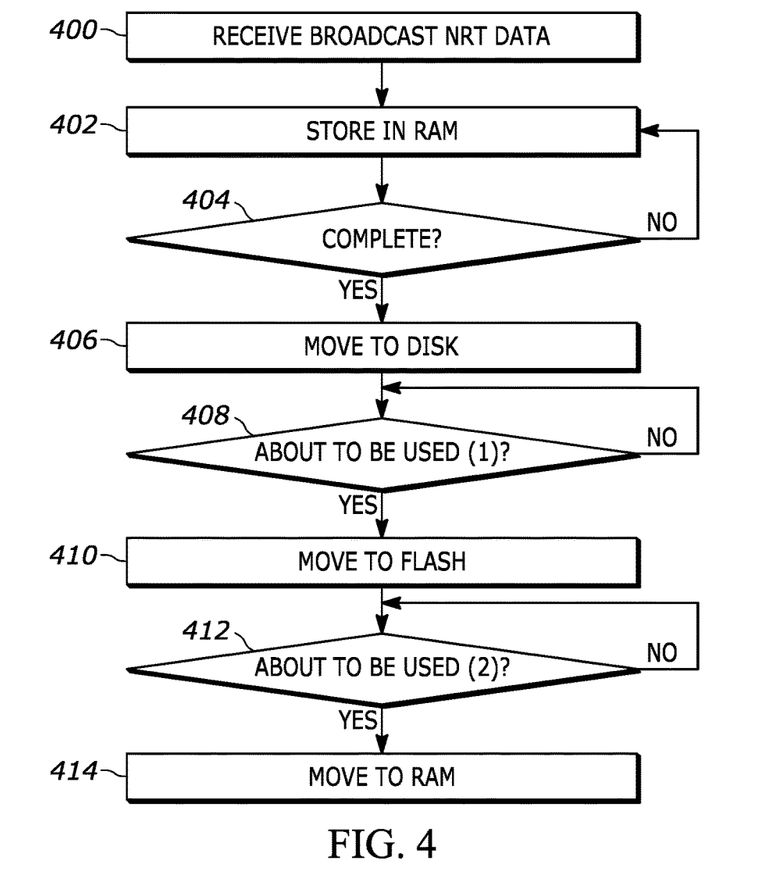
FIG. 4 is a flow chart of example non-real time (NRT) data save logic consistent with present principles.

FIG. 4 illustrates logic for initially receiving non-real time (NRT) broadcast content such as but not limited to advertisements, sports scores, news content, and the like for insertion at some future time into a broadcast live audio video (AV) stream.

Accordingly, in one embodiment, broadcast NRT data packets are initially downloaded into RAM memory first and then moved to more permanent memory such as a hard disk drive (HDD) once the complete package is in RAM. Saved NRT data can be retained until a user changes channels and the oncoming channel contains new NRT data. Old NRT data from the previous channel may not be deleted until the new oncoming NRT data commences being saved in RAM.

In another embodiment the old NRT data is deleted only when the new oncoming NRT data is not the same. Additionally, the NRT data may only be saved on RAM memory to help with performance and save writing and reading actions from the HDD. Some data may be saved in NAND Flash for near line memory retrieval. NRT data that is not needed immediately can be stored first into RAM to be utilized with an XLINK tag quickly. In the use case in which a viewer wants to return to a channel in an hour or two, it is desirable to have the same metadata available to replay or continue watching what the viewer had stopped watching prior to a channel change. Some data that might be re-accessed and needed at some point again is thus available for recall. This data migrates from RT to NRT memory (current channel that then gets changed) and is then stored in NRT memory (channel not active but one that is likely to watched again).

Example use cases of above principles include combining live video and live metadata from broadcast sources (or a broadcast app) and adding to that live event non-real time broadband video sources with their associated metadata. These additional sources of content are supportive of live broadcasts and can be used multiple times. An example is background news stories that can be played with live breaking news stories in a single event and that serve as additional concurrently available streams and called forth from NRT into real time. Sports scores are another example which are presented again over multiple time frames as games finish and the file is added to over a broadband connection. This channel metadata need not be stored in RAM but rather can be stored in FLASH and if needed moved to RAM to be overlaid or inserted into a live broadcast, made available for retrieval using interactive metadata tags. The scores appear as an overlay and are kept stored on the receiver and referred to over the course of an entire event. Non-live supplementary data or streams can be paused or inserted into live content.

Referring now to FIG. 4, commencing at block 400 broadcast non-real time (NRT) data is received by a receiver device such as the device 300 shown in FIG. 3. This data may be replacement advertisements and other replacement content such as, for example, sports tickers and sports scores, news items, and the like, intended for later insertion into a live audio video (AV) broadcast.

Moving to block 402, as it is being received, the NRT data is stored in the RAM 306. This continues until the NRT data has been completely received and stored in the RAM as indicated at decision diamond 404, at which time the logic proceeds to block 406 to move the NRT data to the disk drive 302 or flash memory 304.

By "move" is meant to transfer the data from the RAM to the disk drive or flash, such that no NRT data remains in the RAM or such that any NRT data remaining in the RAM is considered free space that can be overwritten, freeing the RAM to store other data. Thus, "moving" NRT data may entail simply removing indication of RAM storage locations of the NRT data from a control data structure such as an allocation table to permit the NRT data to be freely overwritten.

In general, when the insertion time for the NRT data approaches, it is moved or copied back into RAM. States 408-414 illustrate a non-limiting specific example. Decision diamond 408 indicates a determination that the insertion time satisfies an initial test of upcoming insertion time. This initial test may include identifying that the insertion time is within a relatively lengthy period of the current time, e.g., several seconds. When the initial test is satisfied, the NRT data is copied or moved from disk drive to flash at block 410.

As the insertion time draws closer, a follow-on test is satisfied in the non-limiting embodiment of FIG. 4 as indicated at decision diamond 412, responsive to which the NRT data is coped from the flash to the RAM at block 414. The follow-on test may include identifying that the insertion time is within a relatively short period of the current time, e.g., within one second or less. At the insertion time, the NRT data is inserted from RAM into the AV stream.

Figure 5:
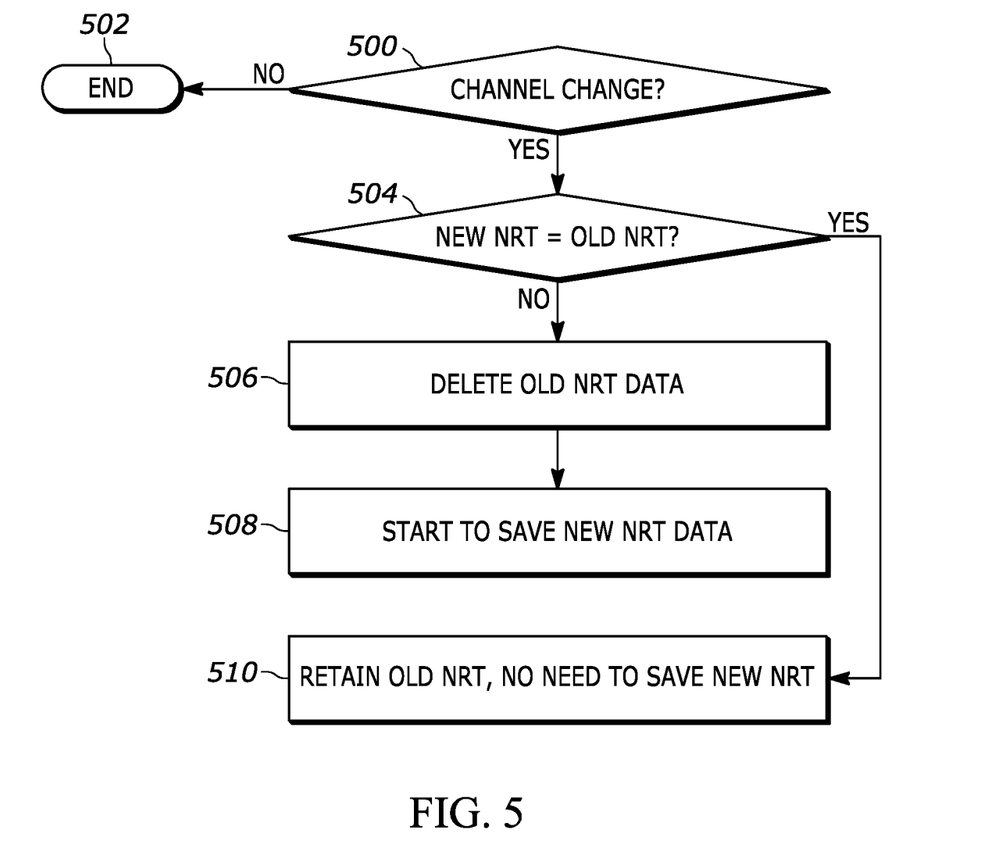
FIG. 5 is a flow chart of example NRT data delete logic consistent with present principles.

FIG. 5 illustrates additional features of the techniques described herein. When it is determined at decision diamond 500 that a channel change has occurred (state 502 simply indicates no channel change), the NRT data associated with the newly tuned-to channel is identified and compared to the NRT data associated with the channel being tuned away from at decision diamond 504. If the new NRT data is different than the NRT data of the tuned-away from channel ("old NRT data"), the old NRT data is deleted at block 506, typically from RAM if residing there, and the new NRT data commences being saved into RAM at block 508.

On the other hand, if the new NRT data happens to be the same as the old NRT data, the logic flows from decision diamond 504 to block 510 to retain the old NRT data, e.g., in RAM and not save the new NRT data.

It will be appreciated that whilst present principals have been described with reference to some example embodiments, these are not intended to be limiting, and that various alternative arrangements may be used to implement the subject matter claimed herein.

What is claimed is:

1. A digital television system comprising:
at least one receiver device comprising at least one display, at least one broadcast signal receiver, and at least one processor configured with instructions which when executed by the processor configure the processor to:
receive from the broadcast receiver at least one audio video (AV) stream for live presentation of the AV stream on the display;
receive from the broadcast receiver at least one non-real time (NRT) content comprising at least one advertisement or at least one news content or both at least one advertisement and at least one new content for insertion of the NRT content into the AV stream at a future time;
store the NRT content in random access memory (RAM);
move the NRT content from RAM to a first storage different from the RAM upon completing receipt of the NRT content in the RAM;
responsive to determining that an insertion time in the AV stream for the NRT content satisfies a first test, copy or move the NRT content from the first storage to the RAM;
at the insertion time, insert the NRT content from the RAM into the AV stream;
responsive to a channel change command from a first channel to a second channel, identify second NRT content associated with a second channel;
responsive to the channel change command, determine whether the second NRT content is the same as the first NRT content;
responsive to determining that the second NRT content is not the same as the first NRT content, remove first NRT content from the RAM and save the second NRT content to the RAM; and
responsive to determining that the second NRT content is the same as the first NRT content, not remove first NRT content from the RAM and not copy the second NRT content into the RAM.

2. The digital television system of claim 1, wherein the first test comprises identifying that the insertion time is within a first period of a current time.

3. The digital television system of claim 1, wherein the RAM comprises a Dynamic RAM (DRAM).

4. The digital television system of claim 1, wherein the DRAM comprises a synchronous DRAM (SDRAM).

5. The digital television system of claim 1, wherein the first storage comprises a disk drive.

6. The digital television system of claim 1, wherein the first storage comprises a flash memory.

7. The digital television system of claim 1, wherein the first storage comprises a disk drive and the instructions are executable to:
   responsive to determining that the insertion time satisfies a second test, copy or move the NRT content from the disk drive to flash memory;
   responsive to determining that the insertion time satisfies the first test, copy or move the NRT content from the flash memory to the RAM;
   at the insertion time, insert the NRT content from the RAM into the AV stream, wherein the second test comprises identifying that the insertion time is within a second period of a current time and the first test comprises identifying that the insertion time is within a first period of the current time, and the second period is longer than the first period.

8. In a digital television system, a method comprising:
   receiving, at an end user receiver comprising at least one display, broadcast non-real time (NRT) content for later insertion thereof into an audio video (AV) stream;
   storing the NRT content in random access memory (RAM);
   moving the NRT content from the RAM to a first storage;
   responsive to an insertion time approaching, copying the NRT content from the first storage to the RAM;
   at the insertion time, inserting the NRT content into the AV stream for play thereof on at least one display;
   responsive to a channel change command from a first channel to a second channel, determining whether second NRT content associated with the second channel is the same as the first NRT content;
   responsive to determining that the second NRT content is not the same as the first NRT content, removing first NRT content from the RAM and saving the second NRT content to the RAM; and
   responsive to determining that the second NRT content is the same as the first NRT content, not removing first NRT content from the RAM and not copying the second NRT content.

9. The method of claim 8, wherein the RAM comprises a Dynamic RAM (DRAM).

10. The method of claim 9, wherein the DRAM comprises a synchronous DRAM (SDRAM).

11. The method of claim 8, wherein the first storage comprises a disk drive.

12. The method of claim 8, wherein the first storage comprises a flash memory.

13. The method of claim 8, wherein the first storage comprises a disk drive and the method comprises:
   responsive to determining that the insertion time satisfies a first test, copying or moving the NRT content from the disk drive to flash memory;
   responsive to determining that the insertion time satisfies a second test, copying or moving the NRT content from the flash memory to the RAM;
   at the insertion time, insert the NRT content from the RAM into the AV stream, wherein the first test comprises identifying that the insertion time is within a first period of a current time and the second test comprises identifying that the insertion time is within a second period of the current time, and the first period is longer than the second period.

14. A computer storage that is not a transitory signal and that comprises instructions executable by at least one processor for:
   communicating with at least one broadcaster assembly configured for broadcasting an audio video (AV) stream and a non-real time (NRT) content associated with the AV stream;
   receiving the AV stream and the NRT content and moving the NRT content from an initial storage location in random access memory (RAM) to a disk drive or a flash memory and then moving or copying the NRT content back to the RAM for insertion thereof into the AV stream at an insertion time;
   responsive to a channel change command from a first channel to a second channel, determining whether second NRT content associated with the second channel is the same as the first NRT content;
   responsive to determining that the second NRT content is not the same as the first NRT content, removing first NRT content from the RAM and saving the second NRT content to the RAM; and
   responsive to determining that the second NRT content is the same as the first NRT content, not removing first NRT content from the RAM and not copying the second NRT content.

15. The computer storage of claim 14, wherein the first storage comprises a disk drive coupled to a flash memory and the receiver device is configured to successively move the NRT content from the disk drive to the flash memory to the RAM for insertion of the NRT content into the AV stream from the RAM.

* * * * *